Feb. 16, 1932.  J. HOLTZMAN  1,845,048
MOTOR FOR WINDSHIELD CLEANERS
Filed July 8, 1927
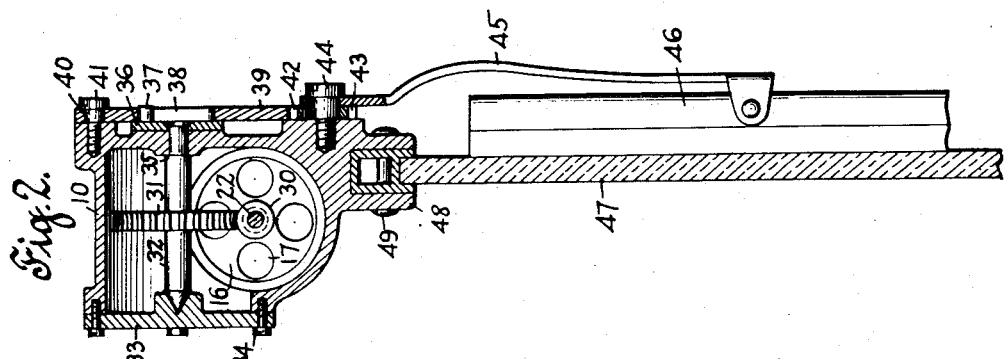
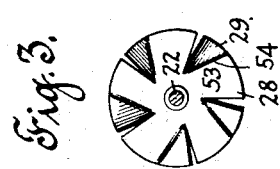
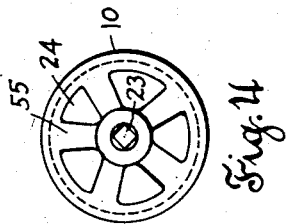
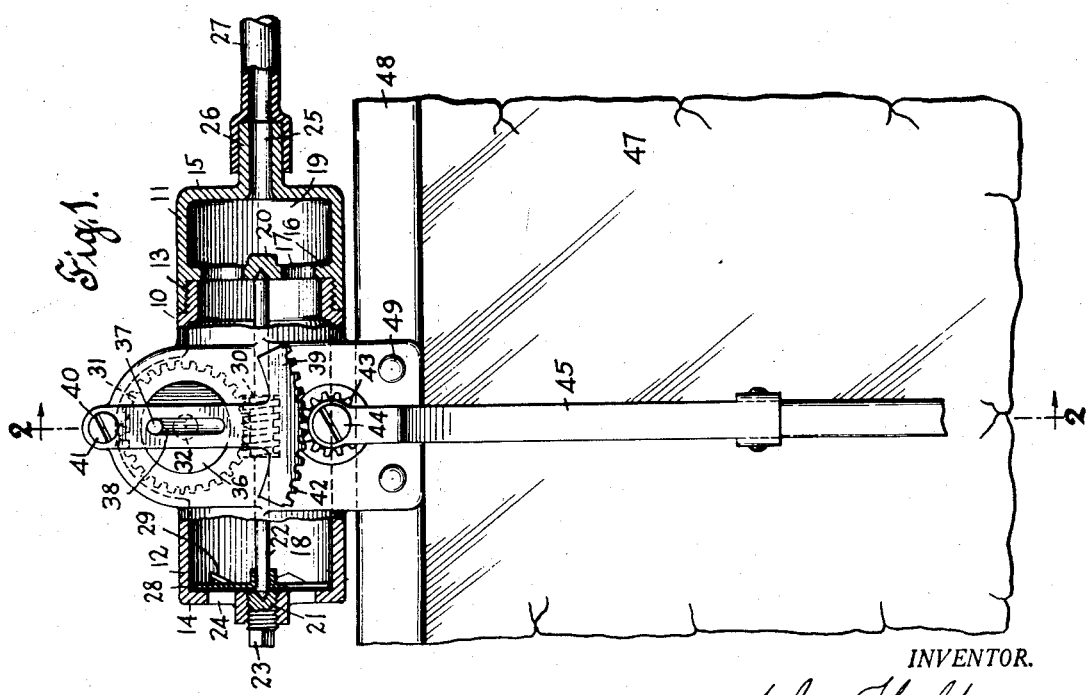
INVENTOR.
John Holtzman.

Patented Feb. 16, 1932

1,845,048

UNITED STATES PATENT OFFICE

JOHN HOLTZMAN, OF NEW YORK, N. Y.

MOTOR FOR WINDSHIELD CLEANERS

Application filed July 8, 1927. Serial No. 204,176.

This invention relates to motors for wind shield cleaners of the type operated by suction and contemplates, among other things, the provision of a rotary fluid operated mechanism and of means for converting the rotary movement into the oscillatory or reciprocatory movement which is usually imparted to the cleaning member.

My improved cleaner is of simple construction being practically continuous in its operation and eliminating valves of all kinds. The various objects of my invention will be clear from the description which follows, and from the drawings, in which, Fig. 1 is a front view partly in vertical section of my improved cleaner showing the device in operative position on the wind shield of an automobile.

Fig. 2 is a vertical section of the same taken on the line 2—2 of Fig. 1.

Fig. 3 is a side view of the air driven fan, by the rotation of which the other mechanism is operated.

Fig. 4 is a side view of the air inlet passage to my improved cleaner.

In the practical embodiment of my invention, I prefer to provide a casing as 10 which, if desired, may be made of two separate sections 11 and 12 secured together as by means of the threaded air-tight joint 13. It will be understood, however, that the casing may be made of one or more parts, as may be deemed desirable to carry out the functions hereinafter described. Arranged between the ends 14 and 15 of the casing 10, is an apertured partition 16, provided with suitable apertures 17 through which air may pass from the inlet compartment 18 to the outlet compartment 19. A suitable bearing 20 in the partition 16, is designed to support one end of the worm shaft 22, while in the end 14 of the casing is revolubly mounted the other end of said shaft 22. Each of the ends of the shaft 22 is preferably tapered to a conical point for minimizing the friction in the bearings therefor. Adjustment of the pressure upon the conical ends may be made either by means of the bearing screw 23 which is in threaded engagement with the bearing 21 and adjustable axially thereof or by the adjustment of the members 11 and 12 of the casing, a suitable depression being made in the screw 23 to receive the conical end of the shaft 22. A series of air inlet openings 24, the shapes of which will be more fully described hereinafter, is made in the end 14 of the casing 10, while at the other end 15, an air outlet passage as 25 is provided. If desired, the nipple 26 may be made integrally with the casing end 15 so that a suitable pipe as 27 may be connected to said nipple at one end thereof, and may be suitably connected at the other end thereof to the intake manifold of an internal combustion engine or with any other suitable source of suction or air withdrawal means in a manner which is well known and which need not be here described in detail. My improved mechanism operates efficiently when actuated by a stream of fluid such as air, whether the stream or current is produced as just mentioned, or by means of a source of heat positioned in the casing for continuously expelling heated air and thereby causing cold air to enter through the apertures 24.

I prefer to mount a fan 28 at one end of the shaft 22 and in close proximity to the inner surface of the casing end 14, whereby a current of air or other fluid entering the interior of the casing through the inlet openings 24 causes said fan and the shaft on which it is mounted to rotate. The fan 28 may be conveniently made of a single disc of sheet metal, a series of vanes 29 being depressed angularly from such a sheet along lines each nearly parallel to an adjacent slit after the slits are made substantially radially of and not quite reaching the center of the disc. The resulting vanes 29 are each arranged in a plane intersecting the flat face 53 of the disc as at 54 and making an acute angle with said face.

The apertures 24 are preferably equal in number to the number of vanes and are substantially but not precisely of the same area and shape as that of the vanes. It will be understood, however, that said apertures are somewhat larger than the vanes whereby the stream of air impinges on at least part of said vanes in any position of the fan disc. The spacers 55 between said openings 24 are also of the proper size and shape to permit a continuous stream of air to rotate the fan continuously by the impingement of said stream on said vanes.

Secured to the shaft 22, is the worm 30, meshing with the worm wheel 31. Said worm wheel is secured to the shaft 32 which is suitably mounted in the casing 10. As illustrated in Fig. 2, I prefer to provide a movable back 33 on said casing, removably held in position as by means of suitable screws 34 so that the parts may be readily assembled and disassembled for repair or replacement. A shoulder as 35 may be provided on the shaft 32 so that said shaft is maintained in position without possibility of displacement. Mounted on one end of said shaft 32 and outside of the casing 10, is the crank disc 36 having the crank pin 37 projecting therefrom and into the slot 38 of the gear segment 39. Said segment is pivotally mounted as at 40 on the casing 10 and is held thereto by a suitable screw as 41. The teeth 42 of said gear segment engage the pinion 43, which is loosely mounted on the stud 44 secured to the casing 10. Rotating with said pinion 43, is the wiper arm 45 to which a wiper as 46 may be secured in the usual manner, whereby the wind shield 47 is cleaned by said wiper on the oscillatory movement of the arm 45.

As illustrated in Figs. 1 and 2 the casing of my improved device may be permanently secured to the wind shield frame 48 as by means of the rivets 49.

The operation of my improved cleaner is as follows.

The pipe 27 being connected in proper communication with a device for removing or conducting air therefrom, a partial vacuum is created in the compartment 19 whereby atmospheric pressure causes air to enter the compartment 18 through the apertures 24. The areas of the outlet passage 25 and of the inlet apertures 24 being properly proportioned, a stream of air entering the compartment 18 strikes the vanes 29 of the fan 28 with sufficient force to cause said fan to rotate, thereby rotating the worm shaft 22, the worm 30 thereon and therethrough, the worm wheel 31. The shaft 32 on which said wheel is mounted, is consequently rotated, imparting rotary motion to the crank disc 36 and to the crank pin 37 thereon, thereby oscillating the gear segment 39, the pin 37 moving in the slot 38 thereof. The pinion 40 meshing with said gear segment is thereby oscillated, imparting its motion to the wiper arm 45 and causing the wiper 46 to move over and to clean the wind shield.

It will be seen that I have provided a sensitive and efficient mechanism for converting the rotary movement of the fan 28 into oscillatory movement of another member such as the gear segment 39 or the wiper arm 45. It will further be seen that the mechanism for so converting rotary into oscillatory movement may be readily adapted for use in other mechanisms than that illustrated provided that a fluid current is available either caused by suction, pressure, heat or other means, since it is obvious that the fan 28 can be caused to rotate either by pressure or by suction so long as the stream of fluid flows in the proper direction.

While I have illustrated and described the preferred embodiments of my invention, I do not intend to be understood as limiting myself thereto, since it will be obvious that various changes may be made therein falling within the spirit and scope of this invention and the range of equivalents afforded by the appended claims.

I claim:

1. In a motor for a wind shield cleaner, a casing having inlet and outlet openings therein, a shaft in said casing, an endwise adjustable bearing for the shaft, a revoluble fan on the shaft adapted to be rotated by fluid entering the inlet openings, an oscillatory member, and a gearing and crank connection between the shaft and the member for oscillating said member alternately in opposite directions on the rotation of the fan.

2. In a motor for wind shield cleaners, a revoluble fan member, a casing having a series of fluid inlet openings in juxtaposition to said fan member and having a similar series of fluid outlet openings in spaced relation to said inlet openings, each of said series of openings, consisting of circumferentially spaced openings each spaced radially from the axis of the casing whereby fluid entering the inlet openings impinges upon the fan member and then moves substantially longitudinally of the casing throughout the entire length of the casing toward the outlet openings, a crank outside of and adjacent said casing, and means enclosed by the casing for operatively connecting said fan member to said crank for rotating said crank continuously on the withdrawal of fluid to the casing through the outlet openings.

3. In a motor for a wind-shield cleaner, a casing having inlet openings at one end and outlet openings at the other end, said openings being formed in the shape of radially disposed open sectors circumferentially spaced about the central portion of the casing end, a bearing at said central portion, a shaft supported by the bearing, a worm on the shaft and intermediate of the ends thereof, a fan disc on one end of the shaft adjacent the inlet end of the casing, substantially triangular vanes bent from the fan disc out of the plane of the fan disc and separated by unbent portions of said disc, said vanes and said inlet openings being arranged to deliver fluid entering the inlet openings in a direction lengthwise of the casing and against said vanes for rotating the fan, a worm wheel engaging the worm, a crank disc mounted coaxially of said wheel, an oscillatory slotted arm pivoted at one of its ends to and outside of the casing, a gear segment at the other end of the arm, a pin on the crank disc entering the slot of the arm, and a gear outside of the casing engaging the segment and oscillated thereby alternately in opposite directions on the rotation of the fan.

4. In a motor for a wind-shield cleaner, a fluid-revoluble fan disc, substantially triangular vanes on the fan disc bent out of the plane of the remainder of said disc and separated circumferentially by portions of said disc, an oscillatory member, a gearing and crank connection between the fan disc and the member comprising a worm wheel operatively connected to and revoluble with the fan disc, a crank disc mounted coaxially of the wheel and revoluble therewith, and means operatively connecting the crank disc to the member for oscillating said member alternately in opposite directions on the rotation of the fan disc, a casing enclosing the fan disc and the wheel and adapted to have fluid withdrawn therefrom, said fluid moving longitudinally of the casing and impinging upon said vanes to rotate the fan disc, said means and said crank disc being located entirely outside of the casing.

5. In a motor for a wind-shield cleaner, a casing having inlet and outlet openings therein arranged in radially spaced relation to the axis of the casing and in position to cause fluid withdrawn from the outlet opening to move longitudinally of the casing, a fluid-operated fan in the casing, a slotted arm pivoted at one end thereof to and entirely outside of the casing and having gear teeth at the other end thereof, means operatively connecting the fan to the arm for oscillating said arm alternately in opposite directions on the rotation of the fan, and a gear mounted on the outside casing engaging said gear teeth and oscillated thereby.

6. In a motor for a wind-shield cleaner, a fluid-operated fan disc, vanes bent from and out of the plane of said disc and separated circumferentially by unbent portions of said disc, a casing enclosing said fan disc, a shaft arranged longitudinally of the casing, bearings carried by the casing at each end of the shaft, one of said bearings being endwise adjustable for adjusting the space between the fan disc and the adjacent end of the casing, a gear segment operatively connected to the shaft whereby rotation of the fan disc in one direction oscillates the arm alternately in opposite directions, and an oscillatory member outside of the casing operatively connected to said arm.

7. In a motor for wind-shield cleaners, a casing having an end wall provided with a central bearing and having fluid inlet apertures arranged circumferentially about and outwardly of the bearing, a removable closure for the other end of the casing provided with a pair of spaced walls, the inner of said walls having a central bearing therein and having fluid outlet apertures arranged circumferentially about the bearing, a fan disc revolubly mounted in adjustably spaced relation to and near said inlet apertures and in the interior of the casing, vanes bent from said fan disc and separated circumferentially by substantially rectangular unbent portions of said disc, each of said portions being limited at one edge by a slit and at the other edge by an edge of the vane bent therefrom, a segmental gear outside of the casing and supported thereby, and means operatively connecting said gear to the fan disc for oscillating said gear alternately in opposite directions on the continuous operation of the fan in one direction by fluid entering said inlet openings impinging upon the vanes and passing longitudinally throughout the length of the casing through the outlet openings.

8. In a motor for wind-shield cleaners, a fluid-operated revoluble fan disc, vanes bent from said disc and separated circumferentially by unbent portions of said disc, an apertured casing for the fan, a shaft carrying said fan revolubly supported at both ends of the casing, a worm on and intermediate the ends of the shaft, a worm wheel in the casing engaging the worm, a crank outside of the casing and mounted coaxially of and rotatable with said wheel, a gear segment pivoted to the casing at one of its ends and operatively connected to said crank, gear teeth at the other end of the segment, and a gear engaging said segment and oscillated thereby on the continuous rotation of the fan by fluid impinging on said vanes.

JOHN HOLTZMAN.